Sept. 15, 1936.  F. GROSS  2,054,370
APPARATUS FOR MAKING CONICAL TUBULAR BODIES
Filed Jan. 22, 1934  4 Sheets-Sheet 1
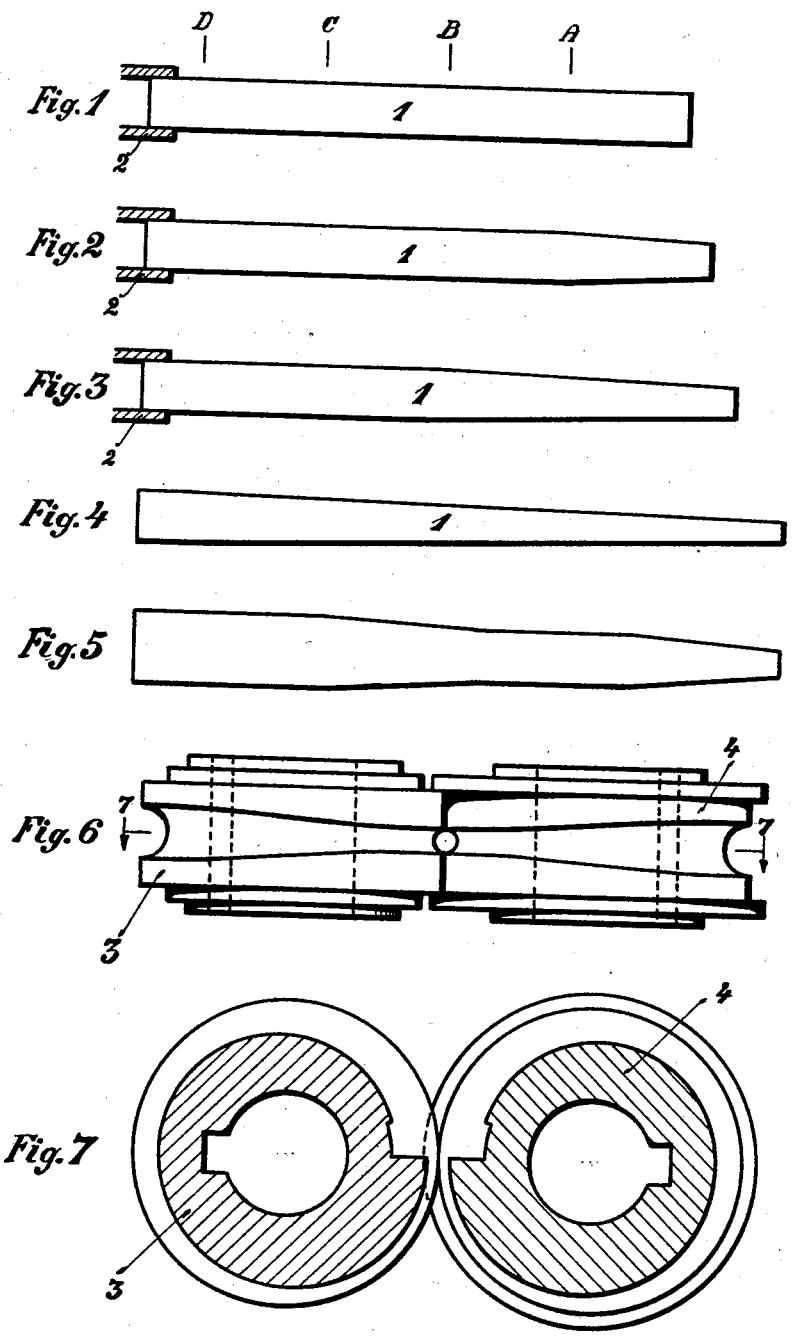

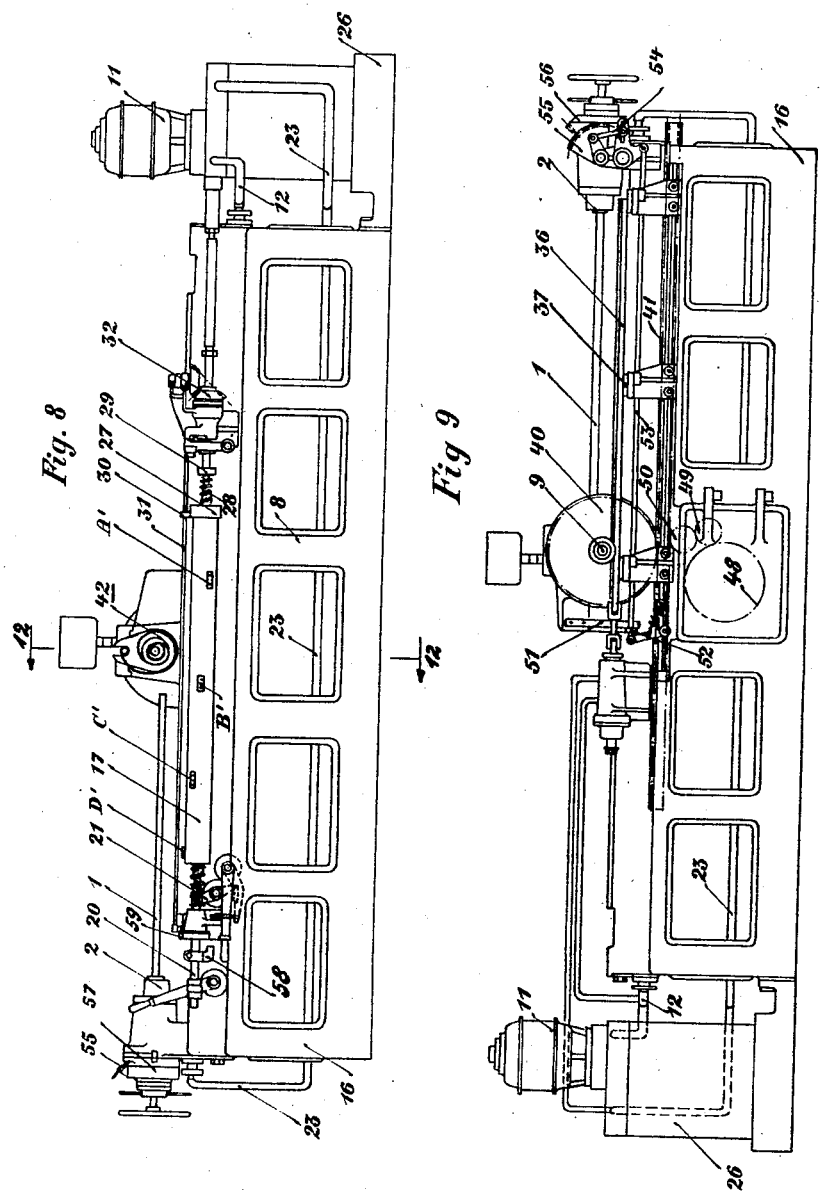

Sept. 15, 1936.    F. GROSS    2,054,370
APPARATUS FOR MAKING CONICAL TUBULAR BODIES
Filed Jan. 22, 1934    4 Sheets-Sheet 3
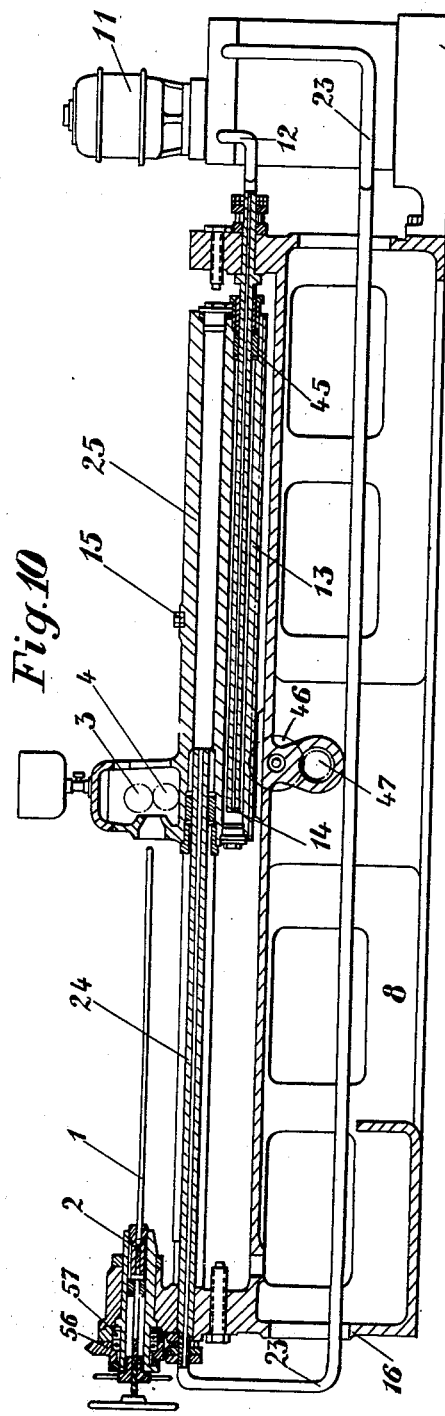
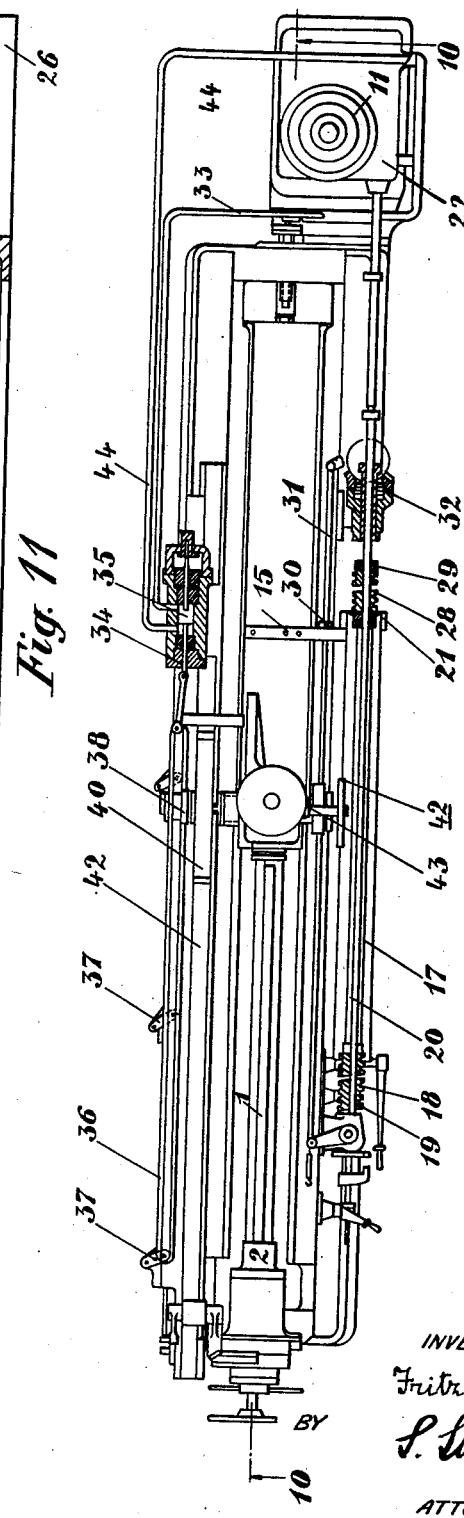
INVENTOR
Fritz Gross
BY
S. Sorral
ATTORNEY Patented Sept. 15, 1936

2,054,370

UNITED STATES PATENT OFFICE 2,054,370

APPARATUS FOR MAKING CONICAL TUBULAR BODIES

Fritz Gross, Dusseldorf, Germany

Application January 22, 1934, Serial No. 707,778
In Germany January 24, 1933

5 Claims. (Cl. 205—3)

Application has been filed in Germany on the 24th January, 1933.

The invention relates to a method of and means for making conical tubular bodies, for instance posts and tubes, the main novel feature of which is the fact that the workpiece consisting of a cylindrical tubular body remains stationary and that the drawing tool is moved relatively to the stationary workpiece. The drawing tool is mounted upon a slide which is moved to and fro. The slide is associated with control means which limit in a variable manner the commencement and the end of the stroke or travel of the slide and which also automatically control the forward and return movement of the slide. Further control means are provided for bringing the drawing tool automatically into action at certain variable times or portions of the travel. The conical tubular body is made from a cylindrical workpiece in several operations, the action being entirely automatic up to its completion. The number of operations depends upon the nature of the material and the required conicity.

The drawings indicate by way of example the improved method and a machine suitable for carrying out same.

Fig. 1 shows the initial blank consisting of a cylindrical body, fixed at one end in a holder.

Fig. 2 shows the same workpiece after the first working operation.

Fig. 3 shows the workpiece after the second operation.

Fig. 4 shows the completely drawn conical workpiece.

Fig. 5 shows a tube having alternating cylindrical and conical portions drawn in accordance with the invention by a slightly modified working method.

Fig. 6 is an elevation of the drawing tool.

Fig. 7 is a section on line 7—7 of Fig. 6.

Fig. 8 is a front elevation of a machine for carrying out the improved method.

Fig. 9 is a rear elevation of the machine.

Fig. 10 is a sectional elevation of the machine on line 10—10 of Fig. 11.

Fig. 11 is a top view of the machine.

Figure 12:
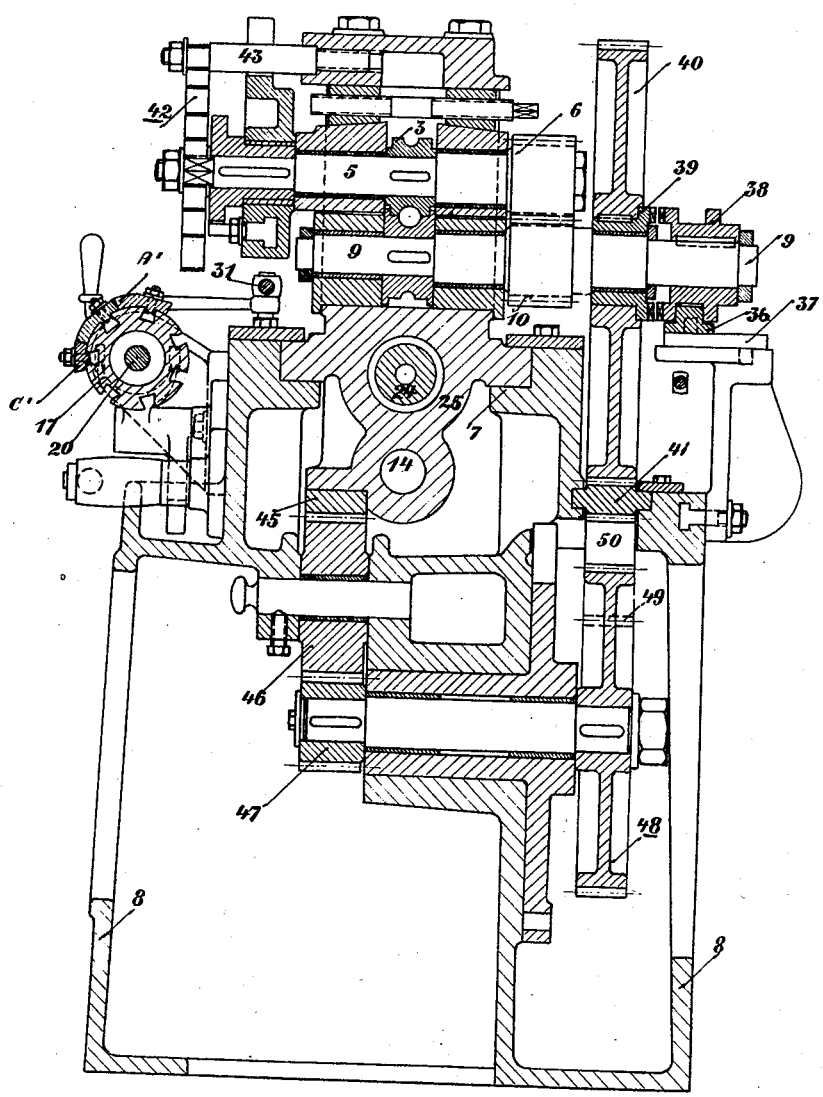
Fig. 12 is a cross section on line 12—12 of Fig. 8 drawn to a larger scale.

The drawing tool or die consists of two rings or rollers 3 and 4 which are rotatably mounted in a movable slide so that they contact with each other upon their peripheries. Each of the rollers is formed upon its periphery with a recess of semicircular cross section, the size or radius of the semicircular cross section being a minimum at one point and gradually increasing to a maximum, as may be seen from Figs. 6 and 7. Upon the shafts 5, 9 of the rollers 3, 4 are mounted toothed gears 6, 10 engaging with each other so that upon rotation of one roller the other roller is also positively rotated. The rollers are so mounted side by side that at their point of contact the two recesses form an exactly circular die opening. By turning the rollers simultaneously the die opening and the passage through the rollers may be increased or reduced according to the direction of rotation. The maximum die opening or passage corresponds to the outer diameter of the cylindrical tubular workpiece 1 from which the conical tubular body is to be made, whilst the smallest die opening corresponds to the minimum diameter at the end of the finished conical tubular body.

The manufacture of the conical tubular body takes place in several working operations. In the example illustrated by Figs. 1 to 4, four such working operations. (A—D) are used.

The cylindrical tubular body 1 is firmly held at one end in a holder 2. The other end of the cylindrical workpiece is either unsupported, or in the case of very large workpieces, it is supported by any suitable means. The slide which carries the drawing tool slides in a bed 7 of the machine frame 8. Before the commencement of the first working operation, the slide is in the position shown in Fig. 10. A pump 11 forces pressure fluid through conduit 12 and a hollow stationary piston 13 into a cylinder 14. The drawing tool 3, 4 is opened so as to provide the maximum die opening. The slide which comprises the cylinders 14, 25 now advances until the drawing tool reaches the position indicated by the letter A in Fig. 1. In this position a stop 15 carried by the slide encounters a first stop A' upon a control drum 17. The control drum 17 is now carried by the slide towards the end 16 of the machine. This movement of the drum compresses a spring 18 supported at the other end by a stationary sleeve 19 upon a control rod 20. Upon increase of the spring pressure a control lever 21 is turned and the spring 18 pushes the rod 20 towards the head end of the machine. By this movement of the control rod 20, control valves located at 22 in the frame are reversed and the pressure fluid is now admitted via conduit 23 and through the stationary hollow piston 24 into the cylinder 25. The slide now moves in the direction towards the tail end 26 of the machine. During this movement of the slide, the rollers 3, 4 constituting the drawing tool are slowly and uniformly rotated by means hereinafter described so as to reduce the opening of the die, whereby the workpiece is drawn conically from the point A to its end, this constituting the first drawing operation. The slide moves towards the tail end of the machine until the stop 15 encounters an annular stop 27 upon the drum 17. The drum 17 is now moved towards the tail end of the machine compressing a spring 28 against a stationary sleeve 29 of the control rod 20. By this means, the locking lever 21 is turned in the opposite direction, and the spring 28 pushes the control rod 20 towards the tail end of the machine, whereby the control valves 22 are again reversed and pressure fluid is again admitted into the return cylinder 14. The stop 15 on coming into contact with the annular stop 27 of the drum 17 simultaneously encounters a stop ring 30 of a spring controlled movable rod 31. This causes by means of a ratchet gear of known kind and a bevel gear 32, the drum 17 to be turned through a certain angle. By this angular movement of the drum, the stop A' is moved out of the path of the stop 15 and another stop B' is moved into the path of the stop 15. The drawing tool now advances to the point B of the workpiece and is then reversed by the stop B'. During the now following second drawing operation, the rollers 3, 4 of the drawing tool are turned in accordance with the longer drawing stroke so as to produce a smaller die opening, and the workpiece is simultaneously drawn to a conical shape from the point B to its end (Fig. 3), this terminating the second drawing operation. On being admitted to the cylinder 25, the pressure fluid is simultaneously admitted via conduit 33 to a control device 34 and moves a control piston 35 towards the head end of the machine. This movement displaces a control rod 36 carried by swing arm 37, the rod 36 being simultaneously moved towards the head end of the machine and towards the centre of the machine. The rod 36 moves a coupling member 38 towards the centre of the machine and causes the claws of the coupling to engage those of a corresponding coupling member 39 fixed to a toothed wheel 40. The toothed wheel 40 is fixed upon a shaft 9 upon which is fixed the roller 4 of the drawing tool and a toothed wheel 10. During the drawing operation, the toothed wheel 40 rolls upon a stationary toothed rack 42 and thereby causes rotation of the rollers 3, 4 of the drawing tool. The diameter of the toothed wheel 40 and the toothed rack 42 are chosen in accordance with the required conicity of the conical tubular body to be produced. In the described example the rollers 3, 4 turn during their movement from the point A to the end of the tube through about one-quarter of their peripheries. At the point A the rollers 3, 4 provide the greatest die opening and on arriving at the end of the tube, the die opening has been correspondingly reduced by the one-quarter rotation of the rollers. Owing to this rotation of the rollers the portion of the tool from the point A to the end is conically drawn. For instance, the diameter of the workpiece may be, at the point A 16 mm. and at the end of the tube 14 mm.

During the second working operation the rollers 3, 4 turn from B to the end of the tube from the point corresponding to maximum die opening through about one half of their peripheries. Consequently the workpiece is made conical from the point B, for instance, the diameter being 16 mm. at B and 12 mm. at the end. During the third working operation, the rollers 3, 4 are turned through three-quarters of their peripheries from the point C, the tube being therefore at C 16 mm. and at the end 10 mm. After the fourth drawing operation the tube is 16 mm. at D and 8 mm. at the end. At the end of the last working operation, the rollers of the drawing tool are then in the position shown in Fig. 7, corresponding to the minimum die opening.

A watch spring 42 fixed to a stationary bolt 43 is tensioned by the rotation of the shaft 5. The pressure fluid on being admitted into conduit 12 in the end position of the slide at the tail end of the machine, is simultaneously admitted to a conduit 44, whereby piston 35 and rod 36 are pulled towards the tail end of the machine. The rod 36 is simultaneously moved outwards, that is, away from the centre of the machine by the swing arms 37, and the coupling member 38 is moved out of engagement with the coupling member 39 of the toothed wheel 40. The tension spring 42 now comes into action and turns the rollers 3, 4 of the drawing tools back into their initial position corresponding to the maximum die opening. Consequently, the rollers 3, 4 are always open to the maximum die opening during any return of the slide to the points A, B, C, D. It will be seen that the length of the drawing stroke increases during the four drawing operations and consequently the rollers of the drawing tool are owing to their longer rotation so turned as to provide at each following drawing operation a smaller die opening.

The above described method is employed in a case in which the length of the tube, the required conicity of the tube, the recess of the rollers of the drawing tool and the proportion of the toothed wheel 40 to the toothed rack 42 are fixed relatively to each other.

With the same drawing tools, shorter tubes having a greater conicity and longer tubes having a smaller conicity may be produced. For this purpose the toothed rack 42 is displaceably mounted and a further toothed rack 45 is fixedly mounted upon the return cylinder 14. During the drawing operation, the toothed rack 45 turns a toothed wheel 46 and this movement is transmitted by gears 47, 48, 49, 50 so as to move in accordance with the selected rate of transmission, the toothed rack 42 in the direction of the draw. Owing to the toothed rack 42 being moved in the direction of the draw, the rotation of the rollers 3, 4 is retarded and consequently the conicity of the tubular workpiece produced is reduced. By putting the gear 49 out of action, the toothed rack may, in accordance with the selected rate of transmission of the intermediate gear, be moved in a direction opposite to the direction of the draw. By this means, the rotation of the rollers 3, 4 may be accelerated and a greater conicity of the workpiece may be attained.

It is desirable that the rollers of the drawing tool should not act during each drawing operation upon the same portion of the periphery of the workpiece, as owing to the existing gap in the die opening, longitudinal ribs might be produced upon the periphery of the workpiece. In order to avoid formation of such ribs or projections, the workpiece is turned after each drawing operation. For this purpose a striker 51 is provided upon the slide which at the end of the drawing operation strikes a stop 52 of a control rod 53. The control rod 53 is, by this means, drawn towards the tail end of the machine and this movement is transmitted by a set of levers 54 to a toothed segment 55, whereby a bevel gear 56 of a control device 57 are actuated to turn the holder 2 and the workpiece 1.

In order to stop the machine after the last drawing operation the following device is provided. After the stop 15 has encountered the annular stop 27 of the control drum 17 and has moved the latter up to the fixed annular stop 29 of the control rod 20 and has turned the control rod 17, the stop releases the locking device 21 and the tensioned spring 28 has the tendency to reverse the pump 11. This is prevented by a lever 58 which is fixedly mounted upon the control rod 20 at the head end of the machine. This lever strikes an exchangeable stop 59 which is mounted upon the bearing standard of the control rod at the head end of the machine, so that the valve of the pump moves only half of its stroke and consequently assumes a position in which the pressure fluid cannot enter into the conduit used for the return movement of the slide. Consequently, the slide carrying the drawing tool will remain in its initial position. If now the control drum be turned by hand until the above mentioned lever 58 clears the fixed stops upon the bearing standard, reversal of the pump valves will take place and immediately by the still tensioned spring 28 the drawing operation will take place as above described. With the above described means, individual sections of a cylindrical workpiece may be conically drawn. With the rollers of the drawing tool remaining stationary, the workpiece may, of course, be drawn cylindrically. In this manner tubes having alternating cylindrical and conical sections, as shown in Fig. 5, may be produced.

I claim:

1. A drawing bench for making conical tubular bodies from cylindrical tubular bodies comprising in combination: a stationary workpiece holder; a drawing tool adapted to be moved to and fro with regard to said holder over the workpiece, said drawing tool consisting of two rotatable rollers having upon their peripheries grooves increasing in cross section from one end to the other; means for rotating said rollers of the drawing tool during the drawing operation; and means for varying the rotation of the rollers during the working stroke, said means for rotating to a variable extent said rollers of the drawing tool comprising: a toothed wheel moving simultaneously to and fro with the tool and operatively connected with the rollers of the drawing tool; a toothed rack co-operating with said toothed wheel; and means for imparting a movement to the toothed rack in the forward and backward direction for the purpose of retarding or accelerating the rotation of the toothed wheel actuating the rollers of the drawing tool, substantially as described.

2. A drawing bench for making conical tubular bodies from cylindrical tubular bodies, comprising in combination: a stationary workpiece holder; a drawing tool adapted to be moved to and fro with regard to said holder over the workpiece, said drawing consisting of two rotatable rollers having upon their peripheries grooves increasing in cross section from one end to the other; means for rotating said rollers of the drawing tool during the drawing operation; and means for varying the rotation of the rollers during the drawing stroke, said means for rotating to a variable extent said rollers of the drawing tool comprising: a toothed wheel moving simultaneously to and fro with the tool and operatively connected with the rollers of the drawing tool; a toothed rack co-operating with said toothed wheel; and means for imparting a movement to the toothed rack in the forward and backward direction for the purpose of retarding or accelerating the rotation of the toothed wheel actuating the rollers of the drawing tool, said last mentioned means for moving said toothed rack in the one or the other direction comprising a second toothed rack connected with the drawing tool and reciprocating therewith and an intermediate changeable transmission gear interposed between the two toothed racks, substantially as described.

3. A drawing bench for making conical tubular bodies from cylindrical tubular bodies, comprising in combination: a stationary workpiece holder; a reciprocable drawing tool comprising two rollers having peripheral grooves of a section increasing from one end to the other; hydraulic means for moving said drawing tool relatively to the workpiece; and means for automatically increasing the stroke of the drawing tool during subsequent operations, said means comprising: a rotatable drum; means for rotating said drum after each drawing operation; a number of stops upon said drum; means for reversing the movement of the drawing tool operated by said stops, substantially as described.

4. A drawing bench for making conical tubular bodies from cylindrical tubular bodies, comprising in combination: a stationary workpiece holder; a drawing tool consisting of two rollers curved upon their peripheries, the sections of the curves increasing gradually in one direction; means for repeatedly moving the drawing tool forwards and backwards relatively to the workpiece; means for increasing after each forward and backward movement of the drawing tool relatively to the workpiece the length of said movement; means for rotating the two rollers of the drawing tool during each drawing operation by a variable amount increasing after each operation, said means for moving the drawing tool relatively to the stationary workpiece comprising a hydraulic cylinder and valve means for controlling the supply of pressure fluid to said cylinder, said valve means being operable by the movement of the drawing tool; and spring means for returning the rollers to the position corresponding to the maximum die opening at the end of each drawing operation.

5. A drawing bench for making conical tubular bodies from cylindrical tubular bodies, comprising in combination: a stationary workpiece holder; a drawing tool consisting of two rollers curved upon their peripheries, the sections of the curves increasing gradually in one direction; means for repeatedly moving the drawing tool forwards and backwards relatively to the workpiece; means for increasing after each forward and backward movement of the drawing tool relatively to the workpiece the length of said movement; means for rotating the two rollers of the drawing tool during each drawing operation by a variable amount increasing after each operation, said means for moving the drawing tool relatively to the stationary workpiece comprising a hydraulic cylinder and valve means for controlling the supply of pressure fluid to said cylinder, said valve means being operable by the movement of the drawing tool; and spring means for returning the rollers to the position corresponding to the maximum die opening at the end of each drawing operation, said means for rotating the rollers comprising a toothed wheel connected with the drawing tool so as to participate in the longitudinal movement of the drawing tool; a stationary toothed rack operating the said toothed wheel; and means for transmitting the movement of the toothed wheel to the rollers of the drawing tool, substantially as described.

FRITZ GROSS.